(12) United States Patent
Mizuno et al.

(10) Patent No.: US 6,934,554 B2
(45) Date of Patent: Aug. 23, 2005

(54) RADIO COMMUNICATION SYSTEM

(75) Inventors: Kohei Mizuno, Kanagawa (JP); Eisuke Kudoh, Miyagi (JP); Hirohito Suda, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 481 days.

(21) Appl. No.: 10/076,557

(22) Filed: Feb. 19, 2002

(65) Prior Publication Data

US 2002/0115458 A1 Aug. 22, 2002

(30) Foreign Application Priority Data

Feb. 21, 2001 (JP) ........................................ 2001-044874

(51) Int. Cl.$^7$ .............................................. H04B 15/00
(52) U.S. Cl. ...................... 455/502; 455/41.2; 455/507; 370/338
(58) Field of Search ............................ 455/502, 422.1, 455/507, 509, 515, 450, 463, 464; 370/338, 341, 252, 310, 480; 375/202

(56) References Cited

U.S. PATENT DOCUMENTS

| | | | |
|---|---|---|---|
| 5,551,066 A | 8/1996 | Stillman et al. | ............... 455/69 |
| 5,896,561 A | 4/1999 | Schrader et al. | ........... 455/67.1 |
| 6,256,334 B1 * | 7/2001 | Adachi | ........................ 375/132 |
| 2003/0012164 A1 * | 1/2003 | Mizoguchi et al. | .......... 370/338 |

FOREIGN PATENT DOCUMENTS

| | | |
|---|---|---|
| EP | 0784387 A2 | 7/1997 |
| WO | WO 99/14897 | 3/1999 |

OTHER PUBLICATIONS

Ganz et al; "Wireless LAN Association Procedure for Multimedia Application"; IEEE 802.11; May 1999; pp 1287–1291.
Leskela, Jyrki; Deterministic Multihop Radio on the top of 802.11 MAC; IEEE; 1998; pp 71–78.
Izumoto et al; "A Self–Organizing Wireless LAN System"; IEEE; 1993; pp467–473.
European Search Report dated Sep. 5, 2002.
Hideo Kamiya, et al., "A Study of Autonomous Multihop Radio Communication", Technical Report of IEICE, SSE97–212, IN97–211, pp. 115–120, Mar. 1998.

* cited by examiner

*Primary Examiner*—Sonny Trinh
*Assistant Examiner*—Doan Phuoc
(74) *Attorney, Agent, or Firm*—Armstrong, Kratz, Quintos, Hanson & Brooks, LLP

(57) ABSTRACT

Each radio station can manage a plurality of channels, and functions both as a master station which controls transmission in each channel and a slave station which operates under control of a master station. In case of a master station, it transmits a signal under control of the own station, and in case of a slave station, it transmits a signal under control of the master station. Each radio station can communicate with any other radio station either directly or through another radio station. In each channel, communication is carried out in time division of centralized control access phase and distributed control access phase. A master station in case of centralized control access phase is determined in each channel and in each link.

9 Claims, 11 Drawing Sheets

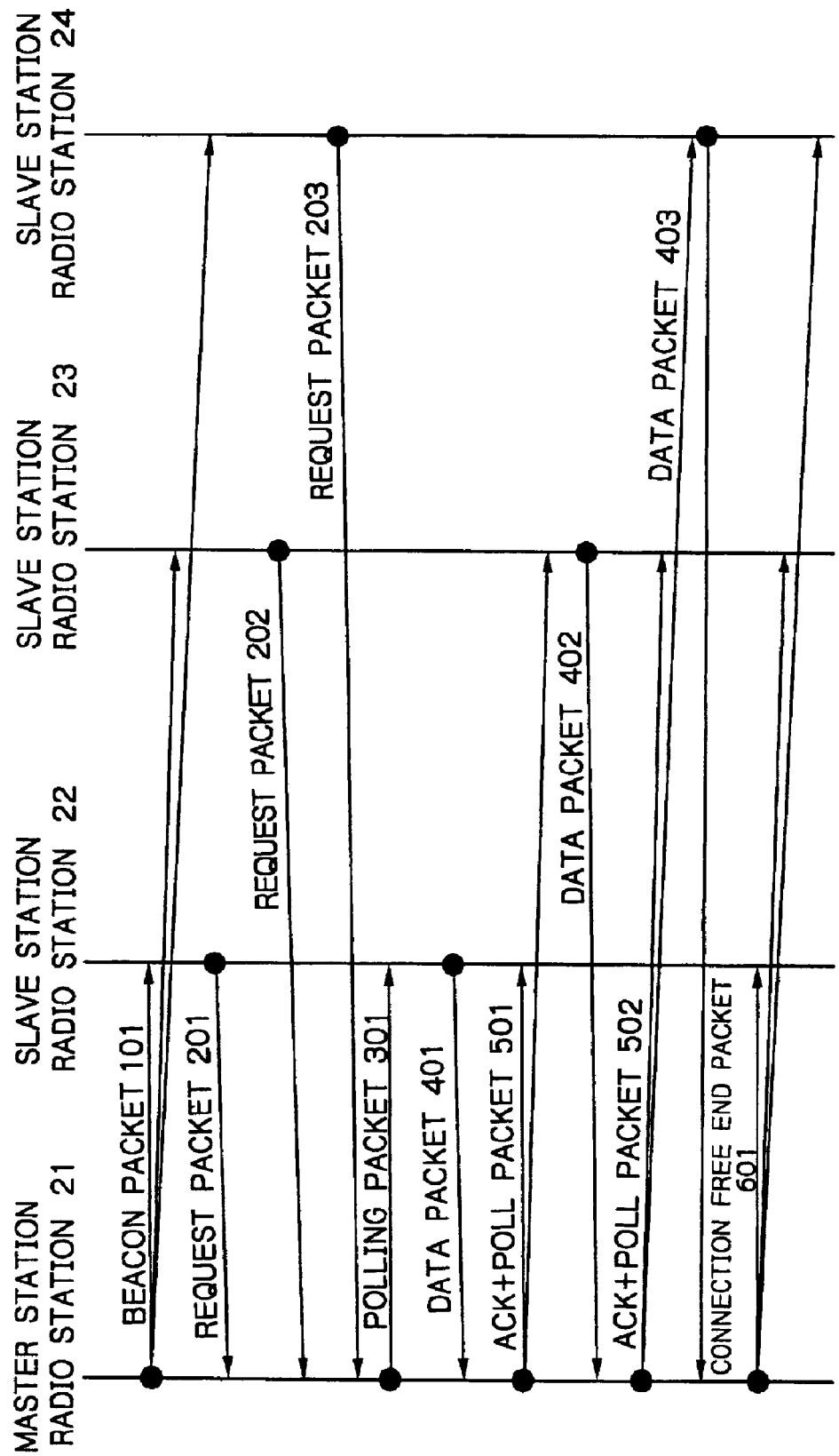

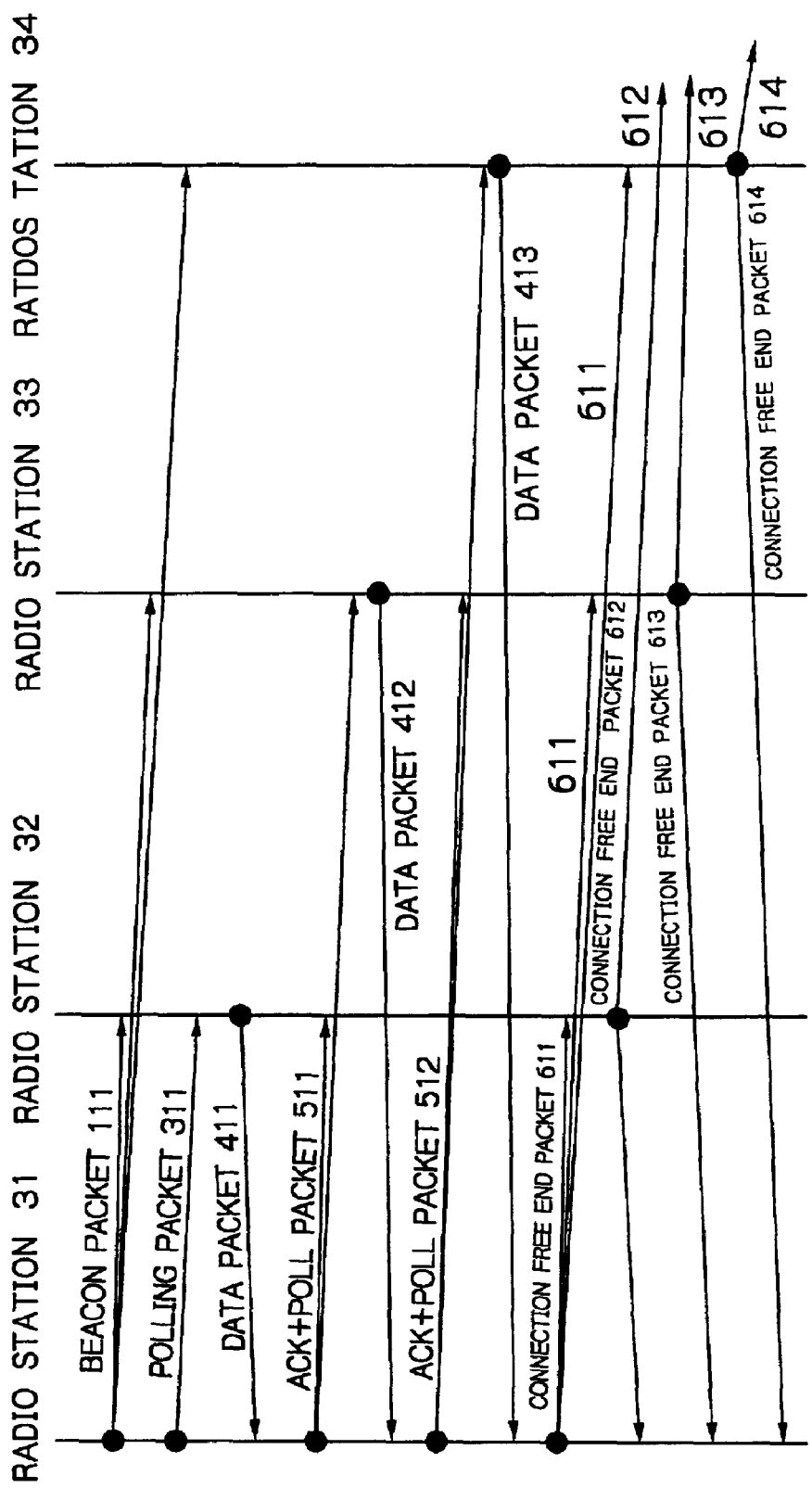

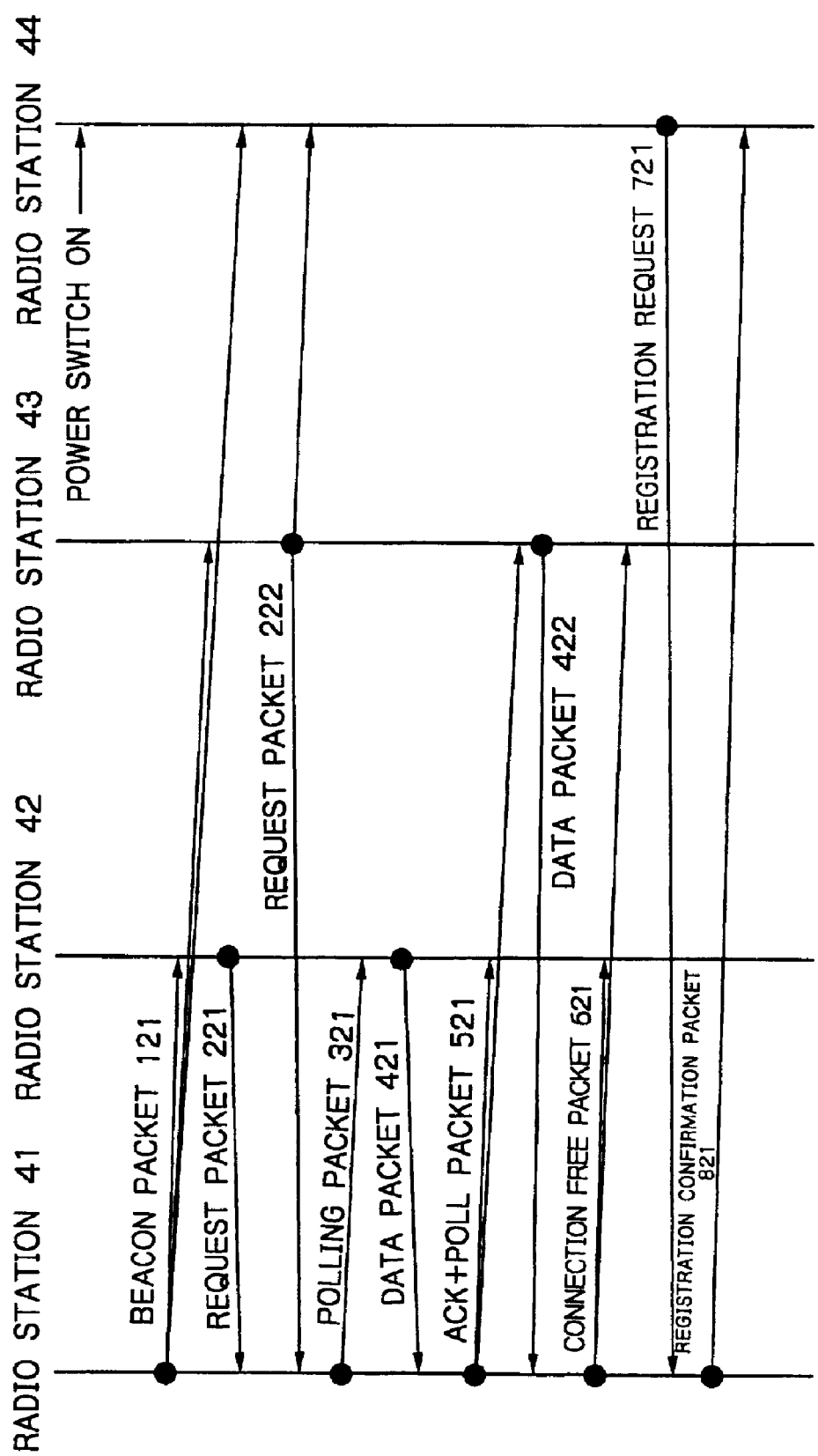

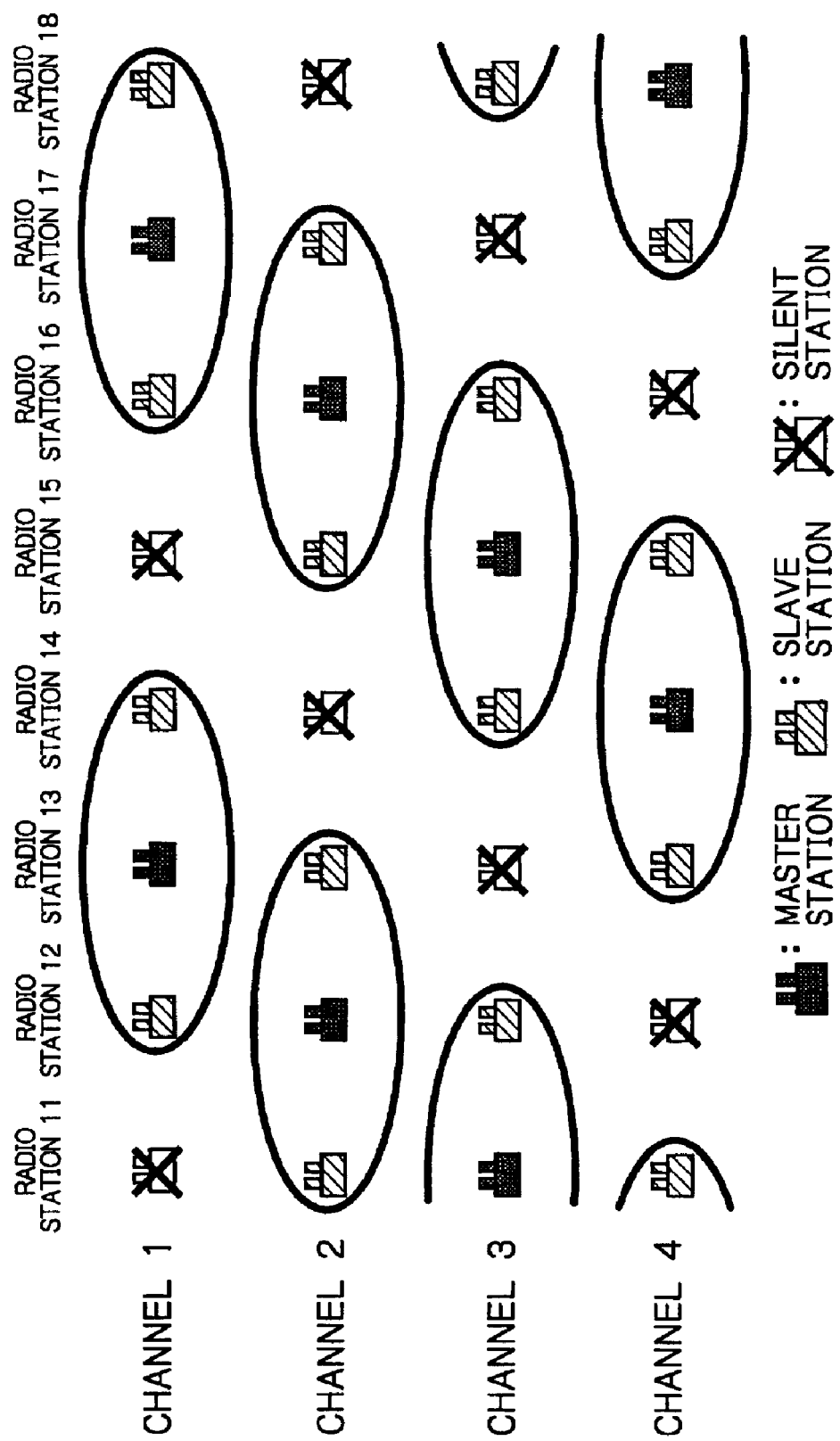

RADIO COMMUNICATION SYSTEM

BACKGROUND OF THE INVENTION

1. Field of the Invention

The present invention relates to a radio communication system, in particular, relates to a multi-hop radio communication system having a plurality of radio links.

2. Description of the Related Art

In a radio packet communication system such as a radio LAN (local area network) system and/or a mobile communication system, a CSMA/CA (Carrier Sense Multiple Access with Collision Avoidance) has been known as a distributed control access system. In that system, it is tested for a predetermined duration whether a channel to which a signal is to be transmitted is available or busy, before a data packet is transmitted, thus, the possibility of collision of packets is decreased. That system is described in ANSI/IEEE Std802.11 Wireless LAN Medium Access Control (MAC) and Physical Layer (PHY) specification, and is taken as MAC protocol of IEEE802.11 standard.

However, when said CSMA/CA system which uses a distributed control access system is used in a multi-hop radio communication network, a competition occurs in each link, and because re-transmission is inevitable in case of a competition, a delay time between end terminals has much variance. Further, when a link is full, the transmission must wait until the link becomes available, and therefore, a delay time increases, thus, a throughput performance is degraded.

However, when said CSMA/CA system which uses a distributed control access system is used in a multi-hop radio communication network, a competition occurs in each link, and because re-transmission is inevitable in case of a competition, a delay time between end terminals has much variance. Further, when a link is full, the transmission must wait until the link becomes available, and therefore, a delay time increases, thus, a thoughtput performance is degraded.

On the other hand, a polling access system which is a centralized control access system, and/or a polling/CSMA system which uses both a distributed control access system and a centralized control access system on time division basis, in which a master station controls transmission of a slave station, is free from a packet collision, and the delay and/or the delay variance is decreased, thus, the throughput performance and the value $Q_0S$ (quality of service) are achieved.

However, in case of a multi-hop radio network, a single master station cannot control all the radio stations. Therefore, a prior polling system, and/or a prior polling/CSMA system cannot be used in a multi-hop radio network.

SUMMARY OF THE INVENTION

It is an object of the present invention, therefore, to overcome the disadvantages and limitations of a prior radio communication system, by providing a new and improved radio communication system.

It is also an object of the present invention to provide a radio communication system for packet communication in a multi-hop radio communication network having a small delay time, small delay time variance, high throughput performance, and achieving quality of service ($Q_0S$).

The above and other objects are attained by a radio communication system comprising; a plurality of radio stations; each radio station managing at least one radio channel for packet radio communication; each radio station communicating with another radio station either directly or through at least one other radio station; each radio station communicating with an adjacent radio station in one of centralized control access phase and distributed control access phase for each radio channel; in centralized control access phase, each radio station operating adaptively either as a master station which controls transmission right and transmits a signal according to control of the own radio station or as a slave station which transmits a signal under control of a master station, for each channel; and said centralized control access phase and said distributed control access phase being switched on a time basis for each radio station and for each radio channel.

Preferably, when a radio station $A_1$ transmits a signal to another radio station An through radio stations $A_2, A_3, , , A_k, A_{k+1}, , , A_{n-1}$ (k is an integer larger than 2 and equal to or smaller than n−1), a radio station $A_k$ communicates with a radio station $A_{k+1}$ through a radio channel between stations $A_k$ and $A_{k+1}$ having the relation of a master station and a slave station, or a radio channel between slave stations $A_k$ and $A_{k+1}$ controlled by a common master station.

Preferably, when a radio station operates in a radio channel as a master station, said radio station transmits a beacon packet including an address of said master station, an address of all the slave stations belonging to said master station and time until each slave station should transmit a request packet to said master station responsive to said beacon packet, for indicating beginning of centralized control access phase, and each slave station, upon receipt of said beacon packet, transmits said request packet to said master station at a time instructed by said beacon packet.

Preferably, when a pair of radio stations operating under relation of a master station and a slave station finish centralized control access phase and switch to distributed control access phase, said master station transmits a contention free end packet indicating an end of centralized control access phase, said contention free end packet includes end time of said centralized control access phase, time until next beacon packet is transmitted, and instruction whether a slave station receiving said contention free end packet should relay said contention free end packet to another slave station, and a slave station which receives said contention free end packet transmits the other contention free end packet to said master station at a time indicated by said contention free end packet sent by the master station, so that centralized control access phase switches to distributed control access phase.

Preferably, each radio station performs carrier sense for a predetermined time for each channel; when said radio station receives a beacon packet from a master station in a specific radio channel, said radio station operates as a slave station belonging to said master station in said radio channel; when said radio station does not receive a beacon packet from a master station but receives a request packet from a slave station in a specific radio channel, said radio station operates as a silent station which is prohibited to transmit a signal during said master station operates in centralized control access phase in said radio channel, and afterwards when said radio station receives a contention free end packet from a master station or a slave station, said radio station operates in distributed control access phase until a time of next beacon packet indicated in said contention free end packet; and when said radio station receives no beacon packet from a master station and no request packet, said radio station operates as a master station in said channel in centralized control access phase.

Preferably, when a first radio station receives no beacon packet from a master station, and no request packet, said radio station selects second radio station which is connected to said radio station in another specific radio channel; said first radio station operates as a master station in said specific radio channel and said second radio station operates as a slave station belonging to said master station, or said second radio station operates as a master station and said first radio station operates as a slave station belonging to said master station.

The present invention further provides a radio station apparatus in a radio network comprising a plurality of radio stations, comprising: each radio station apparatus having at least a radio channel for radio communication; each radio station apparatus being able to operate as one of a master station having a transmission control right in centralized control access phase, a slave station controlled by a master station, a silent station, and distributed control access phase.

BRIEF DESCRIPTION OF THE DRAWINGS

The foregoing and other objects, features, and attendant advantages of the present invention will be appreciated as the same become better understood by means of the following description and drawings, wherein;

FIG. 2A is a first embodiment of a packet process sequence, FIG. 3A is a second embodiment of a packet process sequence, FIG. 4A is a third embodiment of a packet process sequence, FIG. 6 shows allocation of radio channels according to the present invention.

DESCRIPTION OF THE PREFERRED EMBODIMENTS

Figure 1:
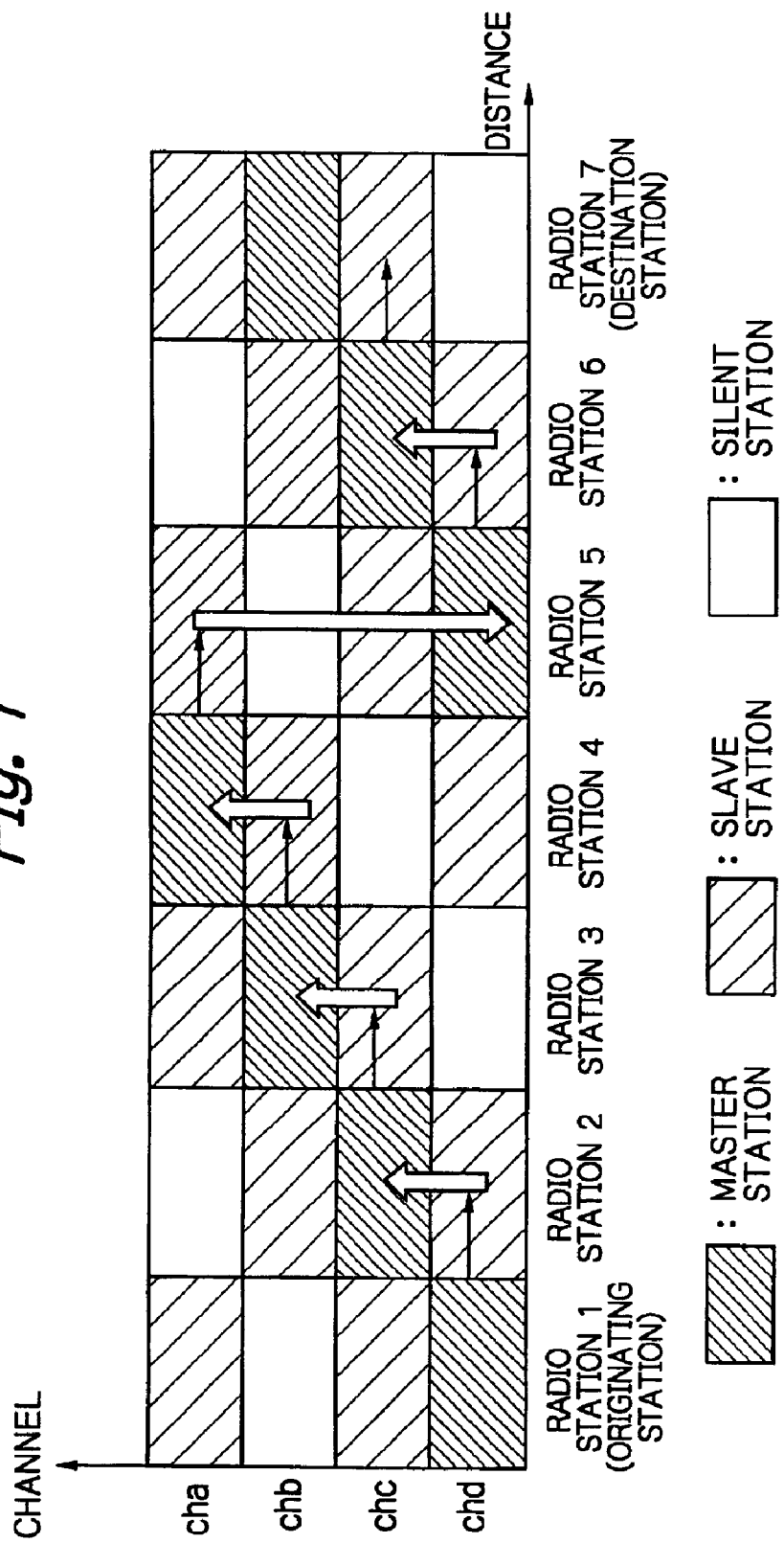
FIG. 1 shows a channel arrangement for packet communication according to the present invention.

FIG. 1 shows channel configuration for a packet transmission system according to the present invention. A method for determining a path between radio stations in a network having a plurality of radio stations has been known, for example, as AODV method (Adhoc On-demand Distance Vector).

In FIG. 1, four channels, channel (a) through channel (d), are used to transmit a packet from a first radio station 1, which is an originating station, to a destination station 7 through radio stations 2, 3 , , , 6. Each radio station is in one of operation modes of a master station, a slave station, and a silent station in a centralized control access system. As shown in FIG. 1, when communication is carried out between the station 1 and the station 2, a channel (c) or a channel (d) between radio stations 1 and 2 with master/slave relationship is used under a centralized control access system. In the channel (c), the radio station 1 is a slave station and the radio station 2 is a master station, while in the channel (d), the radio station 1 is a master station and the radio station 2 is a slave station. Similarly, when communication is carried out between the station 2 and the station 3, a channel (b) or a channel (c) between radio stations 2 and 3 with a master/slave relationship is used under a centralized control access system. Similarly, communication is carried out until a destination station 7 by using a channel between a master station and a slave station. Finally, communication between an originating station 1 and a destination station 7 is carried out under centralized control access system, and $Q_0S$ between the stations 1 and 7 can be achieved.

The above embodiment assumes that a centralized control access system is used in all the links. Of course, some links may use a distributed control access system which has no master/slave relationship.

Figure 2B:
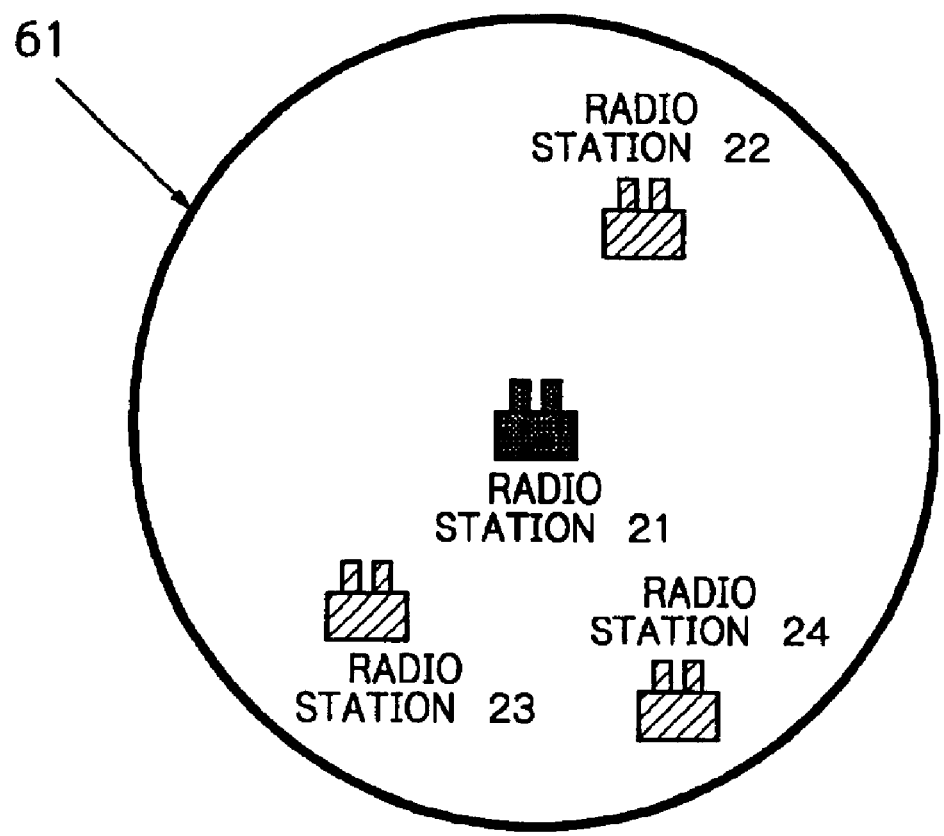
FIG. 2B shows allocation of radio stations relating to FIG. 2A.

FIG. 2A and FIG. 2B show an example of a centralized control access system, in which it is assumed that a master station 21 has a service area 61 which includes slave stations 22, 23 and 24.

In FIG. 2A, the radio station 21 transmits a beacon packet 101 which indicates the beginning of the centralized control access phase to the slave stations 22, 23 and 24 which belong to the master station 21. The beacon packet 101 includes an address of the slave stations 22, 23 and 24, and the time when a slave station should transmit a request packet.

The station 22, upon receiving the beacon packet 101 from the station 21, transmits a request packet 201 to the station 21. Next, the station 23 transmits a request packet 202 to the station 21, and then, the station 24 transmits to the station 21 a request packet 203.

When the time to receive all the request packets from all the stations lapses, the radio station 21 transmits a polling packet 301 to the radio station 22. The polling packet 301 is conventional to those skilled in the art, and includes at least an address of a master station and an address of a slave station. Responsive to the polling packet 301, the radio station 22 transmits a data packet 401 to the radio station 21, then, the radio station 21 transmits a (ACK+POLL) packet 501 which is a combined packet of an acknowledge packet to the data packet 401 and a polling packet to the station 23. Responsive to that packet 501, the radio station 23 transmits a data packet 402 to the radio station 21.

When the master station 21 transmits a polling packet to all the slave stations, the master station 21 transmits a contention free end packet 601 which indicates an end of centralized control access phase and an acknowledge to the data packet 403, to the stations 22, 23 and 24. The contention free end packet 601 includes the time when the centralized control access phase finishes, the time when the station 21 transmits next beacon packet, and an instruction as to whether a slave station should relay a contention free end packet to other slave stations. Thus, a slave station can carry out communication with distributed control access phase until said time (the time when a master station transmits next beacon packet) lapses.

In the above embodiment, a master station receives a request packet by a slave station before the master station initiates a polling operation. Thus, the master station can perform a polling operation considering the information of the request packets. Further, it is possible to relay a contention free end packet to a radio station locating out of a service area 61 where no radio wave by the station 21 reaches.

Figure 3B:
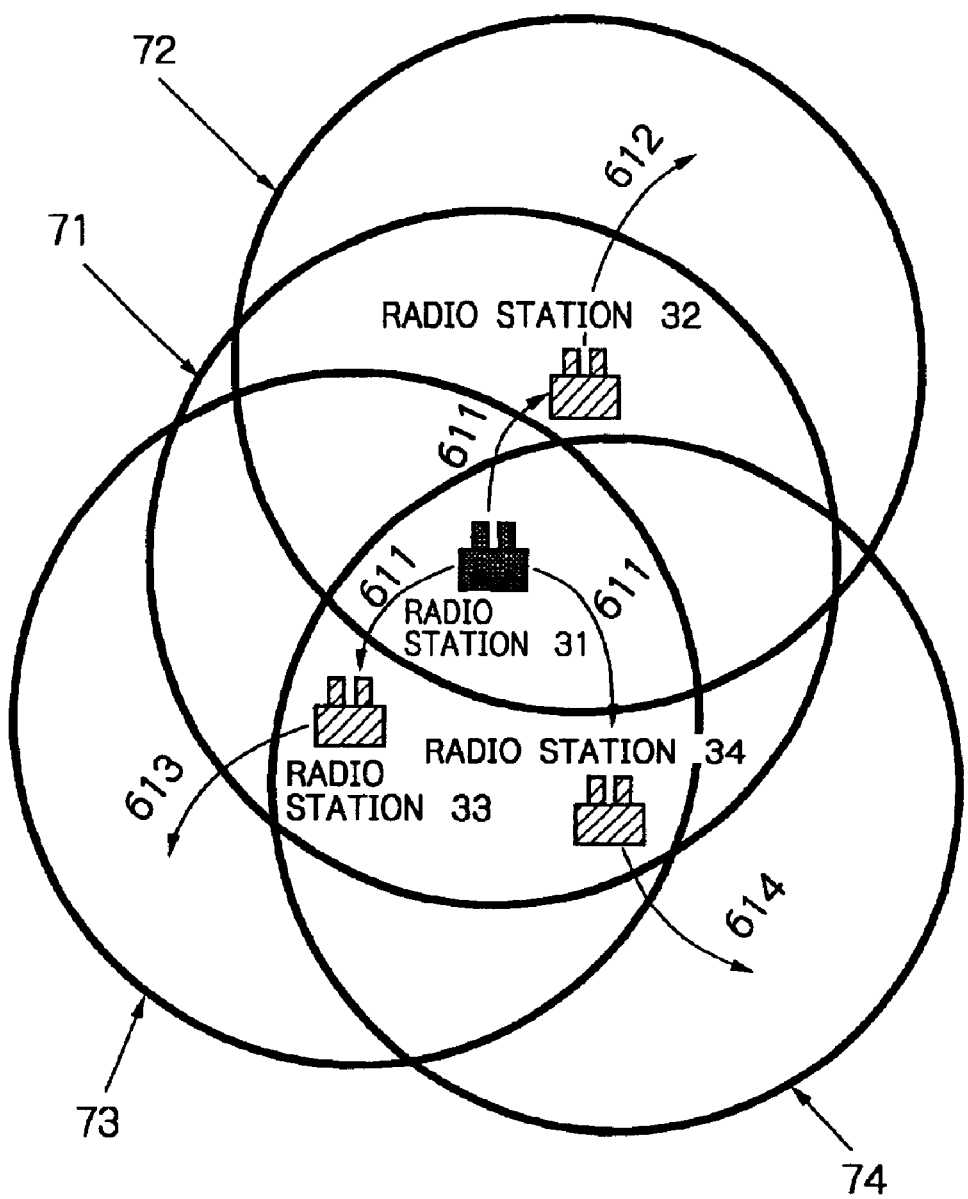
FIG. 3B shows allocation of radio stations relating to FIG. 3A.

Now, relay of a contention free end packet to an out of service area of a master station is described in accordance with FIG. 3A and FIG. 3B. In FIG. 3B, a radio station 31 is a master station having a service area 71. Slave stations 32, 33 and 34 are located in the service area 71.

It is supposed that the master station 31 is under a centralized control access phase and communicates with stations 32, 33 and 34 located in the service area 71 of the master station 31 using a channel in which the station 31 operates as a master station. The centralized control access operation itself (111, 311, 411, 511, 412, 512 and 413) in FIG. 3B is the same as that of FIG. 2A. Upon completion of centralized control access phase to the stations 32, 33 and 34, the radio station 31 transmits a contention free end packet 611 to the stations 32, 33 and 34.

The contention free end packet 611 includes an address of stations 31, 32, 33 and 34, and an instruction to relay a contention free end packet to other slave stations. The radio station 32, upon receipt of the contention free end packet 611 from the radio station 31, transmits a contention free end packet 612 to an area 72 where it is possible to receive a signal sent by the radio station 32. Similarly, the radio stations 33 and 34 transmit contention free end packets 613 and 614, respectively, to the service areas 73 and 74, respectively. Therefore, it is possible to relay a connection end packet to a radio station locating out of a service area 71 of the radio station 31.

The connection end packets 612, 613 and 614 thus relayed can further be received by the master station 31 itself.

A radio station which locates with a service area 72, 73 or 74, but out of a service area 71, cannot receive a signal of a master station 31, but can receive a signal of a slave station 32, 33 or 34. The station operates as a silent station which does not transmit a signal during centralized control access phase by a master station 31. When the centralized control access phase by a master station 31 finishes, and the station receives a contention free end packet from a slave station 32, 33 or 34, then, the station can communicate with the slave station 32, 33 or 34 under distributed control access phase.

Figure 4B:
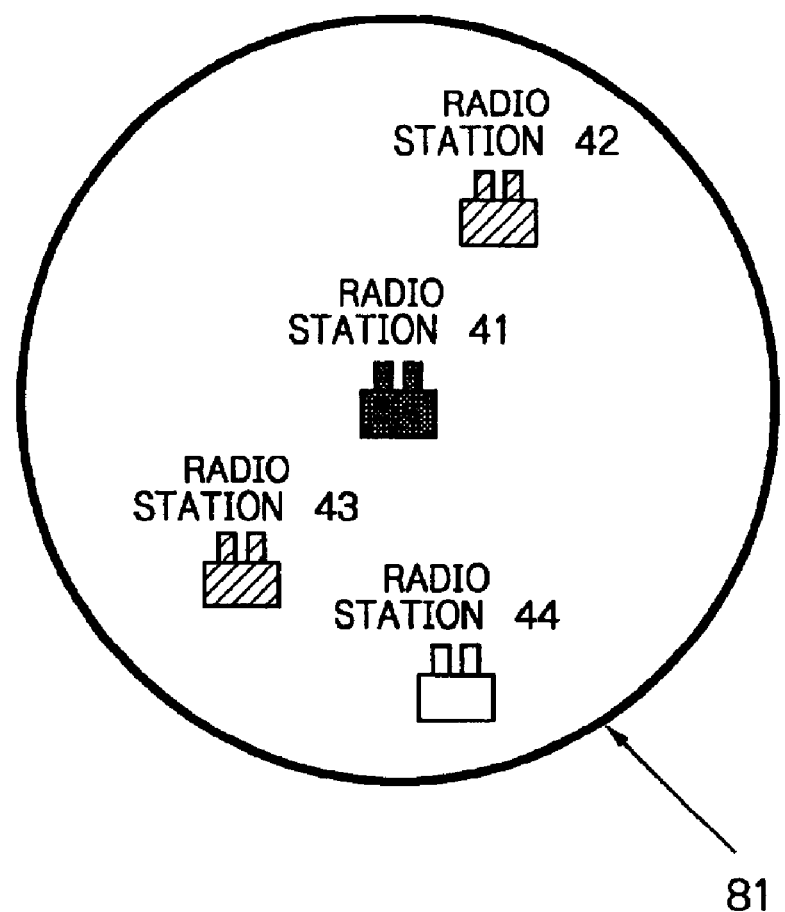
FIG. 4B shows allocation of radio stations relating to FIG. 4A.

FIG. 4A and FIG. 4B show the operation to register a new radio station 44 as a slave station located in a service area 83 of a master station 41, when two slave stations 42 and 43 are located in the area 83 of the master station 41.

It is supposed that a radio station 41 is in a centralized control access phase in a specific channel, operating as a master station for slave stations 42 and 43. It is assumed that another radio station 44 locating in a service area 81 of the radio station 41 switches ON, so that the new station 44 begins communication in the channel which the radio station 41 operates as a master station.

The centralized control access operation (121, 221, 222, 321, 421, 521, 422 and 621) to slave stations 42 and 43 by a master station 41 is the same as that of FIG. 2A and FIG. 3A.

A new station 44 carries out carrier sense for a predetermined time. When it receives a beacon packet 121 from the radio station 41, it transmits the master station 41 a registration request packet 721, which includes an address of the own station 44, an address of a relay station when there is a relay station, and an address of a master station. The new station 44 may transmit the registration request packet 721 either anytime after the beacon packet 121, or at a time which is designated by the master station 41. The master station 41, upon receipt of the registration request packet 721 from the new station 44, transmits a registration confirmation packet 821 to the new station 44 on the condition that it is possible to register the new station 44 as a slave station of the master station 41. A registration confirmation packet 821 includes an address of a new station, an address of a relay station when there is a relay station, and an address of a master station. The radio station 44 operates as a slave station of the radio station 41 when it receives the registration confirmation packet 821 from the radio station 41. Thus, a new station which can receive a signal of a master station is registered as a slave station of the master station.

Figure 5A:
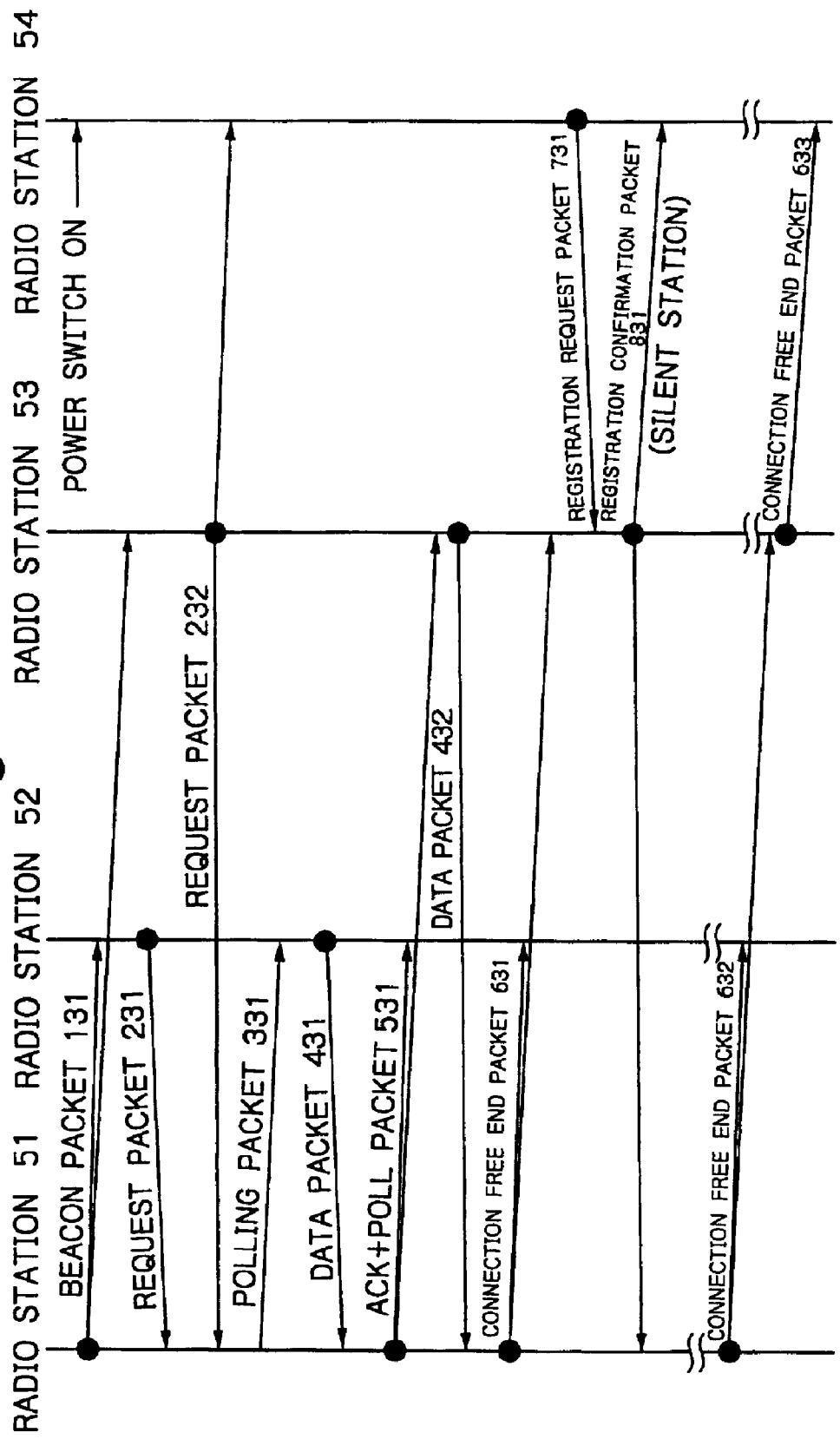
FIG. 5A is a fourth embodiment of a packet process sequence.
Figure 5B:
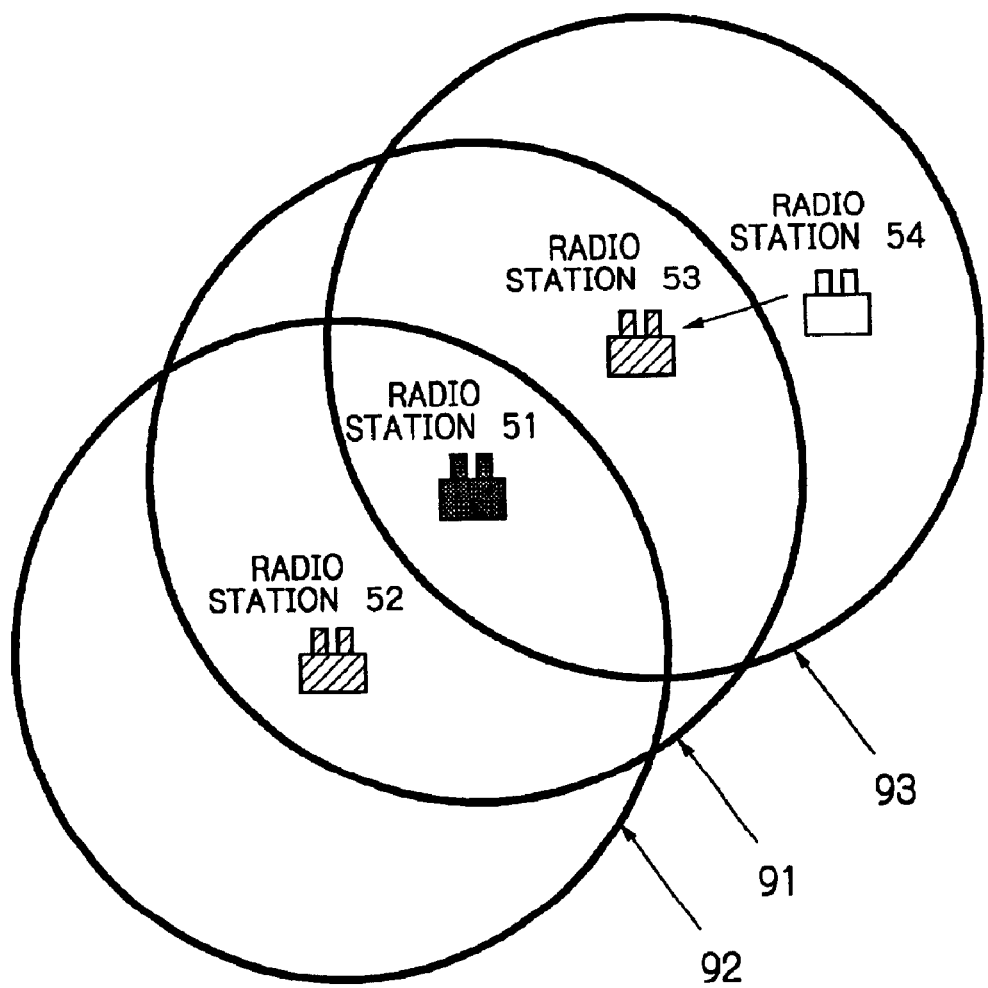
FIG. 5B shows allocation of radio stations relating to FIG. 5A.

FIG. 5A and FIG. 5B show the operation to register a new station 54 which is located out of a service area 91 of a master station 51, when there are slave stations 52 and 53 in the service area 91 of the master station 51.

It is assumed that a new station 54 is located out of the service area 91 of the master station 51, but in the service area 93 of the radio station 53, and the new station 54 switches ON a channel in which the station 51 operates as a master station, so that the new station 54 begins communication.

The centralized control access operation by a master station 51 to slave stations 52 and 53 is the same as that of FIG. 2A, FIG. 3A and FIG. 4A. The new station 54 carries out carrier sense for a predetermined period. When the new station 54 does not receive a beacon packet 131 from the master station 51, but receives a request packet 232 from the slave station 53, it transmits a registration request packet 731 to the slave station 53 anytime after it receives the request packet 232. The radio station 53, upon receipt of the registration request packet 731 from the new station 54, transmits a registration confirmation packet 831 to the new station 54 on the condition that the transmission is possible.

In this case, the new station 54 is registered as a silent station which is not allowed to transmit a signal. Then, when the radio station 53 receives a contention free end packet 632 from the master station 51, it relays the contention free end packet to the new station 54. The contention free end packet 633 includes a time when the master station 51 sends a next beacon packet. The new station 54, upon receipt of the contention free end packet 633 from the radio station 53, can operate in a distributed control access phase until next beacon packet which is designated by the contention free end packet.

Thus, a new station which cannot receive a signal from a master station, but can receive a signal from a slave station can be registered as a silent station, which recognizes the end of centralized control access phase by a signal from a slave station. Then, the new station can carry out a communication in a distributed control access phase until next centralized control access phase.

FIG. 6 shows an arrangement of a radio channel according to the present invention. When the operation as described is carried out, a radio channel is allocated to each radio station as shown in FIG. 6. When a radio channel is allocated to each radio station as shown in FIG. 6, a communication from an originating station to a destination station is possible through centralized control access phase, or time division control of distributed control access phase and distributed control access phase, as shown in FIG. 1. Thus, $Q_oS$ is assured.

Figure 7:
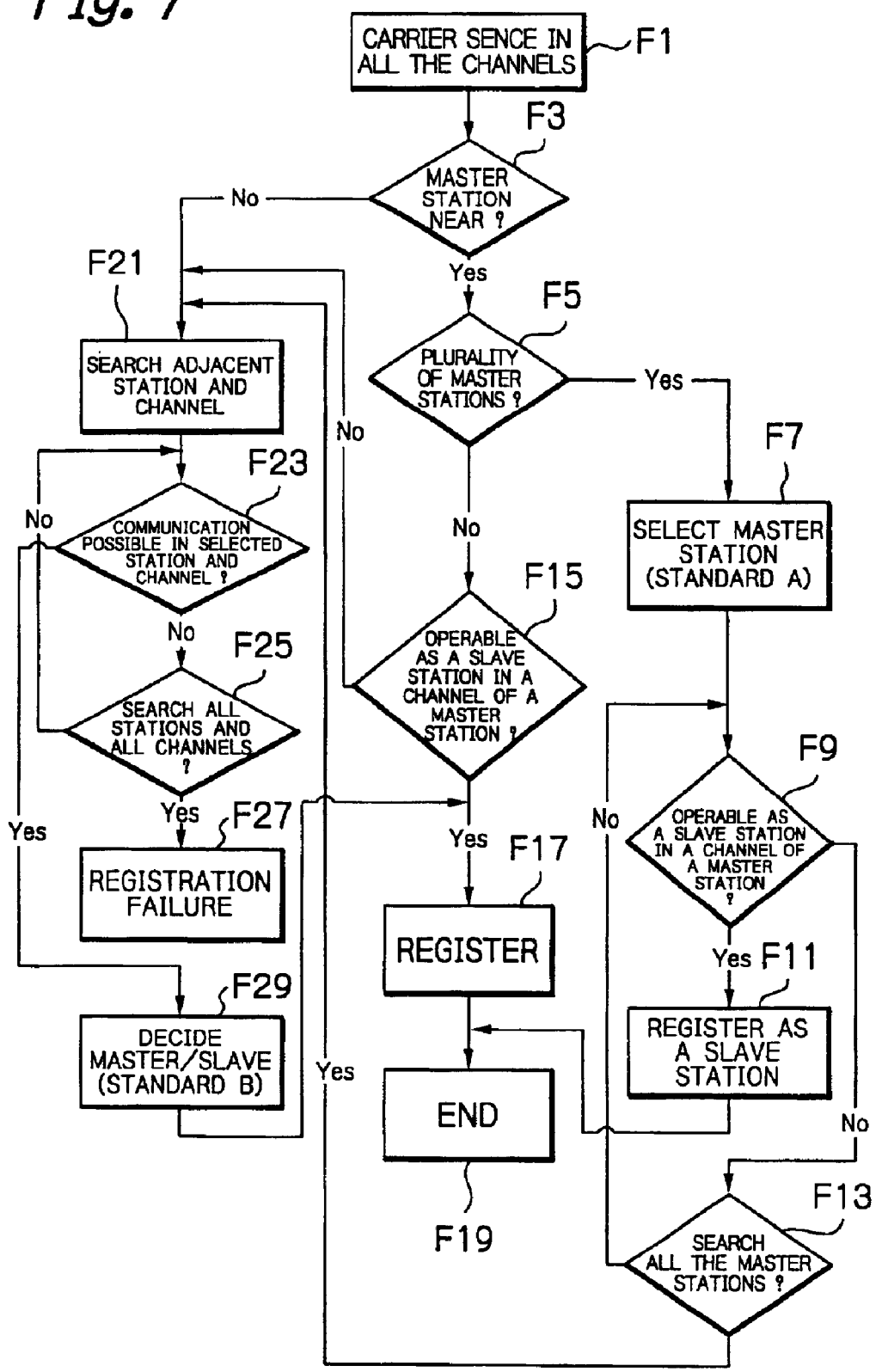
FIG. 7 shows operational flow when a new radio station is registered to a network.

FIG. 7 shows the operation when a new station which does not belong to a centralized control access system is registered to the centralized control access system as a master station or a slave station.

When there are a plurality of candidate radio stations to which a new station intends to be registered, the new station is registered to a specific candidate station according to the following standard A, or the combination of items in the standard A.

Standard A (A1) A new station is registered to a radio station having fewer hops to a gateway which is connected to a wired network.

(A2) A new station is registered to a radio station which provides more receive power to the new station.

(A3) A new station is registered to a radio station having smaller interference.

(A4) A new station is registered to a radio station which is coupled with fewer stations.

(A5) A new station is registered to a radio station which can accept more interference on the condition that a desired C/I (Carrier to Interference Ratio) is satisfied.

When a radio station to which a new station is to be registered is not a master station, the criteria which station, a new station or a station to which a new station is to be registered, is a master station, is determined according to the following standard B, or the combination of items in the standard B.

Standard B (B1) A new station is registered as a master station.

(B2) A radio station to which a new station is to be registered becomes a master station.

(B3) A radio station having more capacity of battery in case of a mobile station becomes a master station.

(B4) A station using a fewer channels becomes a master station.

(B5) A station suffering from less interference becomes a master station.

In FIG. 7, a new station which intends to be registered in a centralized control access system carries out carrier sense operation in all the channels for a predetermined time (F1) As a result of carrier sense operation, when a receive level of a beacon packet, a request packet, and a contention free end packet exceeds a threshold level, a flag is marked in a table of a channel and a connect radio station. That table includes a receive power level in each channel from each radio station, an interference power level in said channel by other radio stations, and an information whether the radio station which transmits each of said packets is a master station which controls the channel, or a slave station. Thus, it is determined whether or not a master station exits near the new station (F3). When a plurality of master stations are recognized (F5), a single master station is selected according to said standard A (F7).

Next, it is determined whether or not it is possible that a new station can operate as a slave station in a specific channel of a master station thus selected, by measuring whether interference is less than an allowable threshold or not (F9, F15). If the answer is yes, the new station is registered as a slave station (F11, F17), and the registration operation finishes (F19).

When it is impossible to register a new station as a slave station in F9, the operation of F9 and F11 is repeated until all the master stations are exhausted (F13). If a master station to which a new station can be registered is found, the new station is registered to the master station as a slave station.

When there are a plurality of master stations near a new station, which desires to be registered to all the master stations in each respective channel, the operation after the registration in F11 does not finish in F19, but goes to F13 so that the registration to another master station is tried in F9 and F11.

When no master station is detected in a carrier sense in F1, it is impossible to be registered as a slave station in F15, and no registration as a slave station is possible after all the master stations are tried in F13, the operation goes ahead F21 which searches an adjacent radio station and a related channel. The search is carried out by detecting a request packet and/or a contention free end packet. When a plurality of stations are detected in the search, a single station is selected according to said standard A.

When an adjacent station with a related channel is detected, it is determined whether or not communication is possible by using the detected channel by measuring, for instance, interference in the detected channel (F23). When it is determined that the communication is possible in F23, the operation goes ahead F29, which determines whether a new station is registered as a master station or a slave station according to the standard B (F29). According to the decision in F29, the registration is carried out in F17.

When it is determined that the communication is impossible in F23, it is determined if the communication is possible by using another station and/or another channel (F25). When the communication is impossible in all the stations and all the channels, the registration is failure (F27).

As described above, in a multi-hop radio packet communication network having a plurality of radio stations, the present invention uses a centralized control access phase or time division operation of centralized control access phase and distributed control access phase in a multi-hop radio packet communication using a plurality of channels. Further, according to the present invention, a master station which controls a centralized control access system is selected in each channel or link. Thus, the delay and/or the variant of delay is decreased, throughput performance and $Q_0S$ are improved, although a prior centralized control access system has disadvantages that the delay, the delay variant, throughput performance, and/or $Q_0S$ are deteriorated.

From the foregoing, it is now apparent that a new and improved radio communication system has been found. It should be understood of course that the embodiments disclosed herein are merely illustrative and are not intended to limit the scope of the invention. Reference should be made, therefore, to the appended claims to indicate the scope of the invention.

What is claimed is:

1. A radio communication system comprising a plurality of radio stations, wherein each said radio station manages at least one radio channel for packet radio communication, wherein each said radio station communicates with another radio station either directly or through at least one other radio station, wherein each said radio station communicates with an adjacent radio station in one of centralized control access phase and distributed control access phase for each radio channel, whereby, in the centralized control access phase, each radio station operates adaptively either as a master station which controls transmission right and transmits a signal according to control of the own radio station or as a slave station which transmits a signal under control of a master station, for each channel, wherein said centralized control access phase and said distributed control access phase are switched on time divisional basis for each radio station and for each radio channel, wherein when a radio station operates in a radio channel as a master station, said radio station transmits a beacon packet including an address of said master station, an address of all the slave stations belonging to said master station and time until each slave station should transmit a request packet to said master station response to said beacon packet, for indicating beginning of a centralized control access phase, and each slave station, upon receipt of said beacon packet, transmits said request packet to said master station at a time instructed by said beacon packet, and wherein a pair of radio stations operating under relation of a master station and a slave station finish the centralized control access phase and switch to the distributed control access phase, said master station transmits a contention free end packet indicating an end of the centralized control access phase, said contention free end packet includes an end time of said centralized control access phase, a time until a next beacon packet is transmitted, and an instruction whether or not a slave station receiving said contention free end packet should relay said contention free end packet to another slave station, and a slave station which receives said contention free end packet transmits the other contention free end packet to said master station at a time indicated by said contention free end packet sent by the aster station, so that the centralized control access phase switches to the distributed control access phase.

2. The radio communication system according to claim 1, wherein when a radio station $A_1$ transmits a signal to another radio station An through radio stations $A_2$, $A_3$, , , , $A_k$, $A_{k+1}$, , , $A_{n-1}$ (k is an integer larger than 2 and equal to or smaller than n−1), a radio station $A_k$ communicates with a radio station $A_{k+1}$ through a radio channel between stations $A_k$ and $A_{k+1}$ having a relation of a master station and a slave station, or a radio channel between slave stations $A_k$ and $A_{k+1}$ controlled by a common master station.

3. The radio communication system according to claim 1, wherein each radio station performs carrier sense for a predetermined time for each channel, when said radio station receives a beacon packet from a master station in a specific radio channel, said radio station operates as a slave station belonging to said master station in said radio channel, when said radio station does not receive a beacon packet from a master station but receives a request packet from a slave station in a specific radio channel, said radio station operates as a silent station which is prohibited from transmitting a signal during when said master station operates in the centralized control access phase in said radio channel, and afterwards when said radio station receives a contention free end packet from a master station or a slave station, said radio station operates in the distributed control access phase until a time of next beacon packet indicated in said contention free end packet, and when said radio station receives no beacon packet from a master station and no request packet, said radio station operates as a master station in said channel in the centralized control access phase.

4. The radio communication system according to claim 3, wherein when a first radio station receives no beacon packet from a master station, and no request packet, said radio station selects a second radio station which is connected to said radio station in another specific radio channel, said first radio station operates as a master station in said specific radio channel and said second radio station operates as a slave station belonging to said master station, or said second radio station operates as a master station and said first radio station operates as a slave station belonging to said master station.

5. A radio station apparatus in a radio network comprising a plurality of radio stations, wherein each radio station apparatus has at least a radio channel for radio communication, and wherein each radio station apparatus is able to operate adaptively as one of a master station having transmission control right in centralized control access phase, a slave station controlled by a master station, a silent station, and a distributed control access phase, wherein said centralized control access phase and said distributed control phase are switched on a time divisional basis for each radio channel, wherein when a radio station operates in a radio channel as a master station, said radio station transmits a beacon packet including an address of said master station, an address of all the slave stations belonging to said master station and time until each slave station should transmit a request packet to said master station responsive to said beacon packet, for indicating beginning of a centralized control access phase, and each slave station, upon receipt of said beacon packet, transmits said request packet to said master station at a time instructed by said beacon packet, and wherein when said radio station apparatus operates with another radio station apparatus as a pair of radio stations operating under relation of a master station and a slave station finish the centralized control access phase and switch to the distributed control access phase, said master station transmits a contention free end packet indicating an end of the centralized control access phase, said contention free end packet includes an end time of said centralized control access phase, a time until a next beacon packet is transmitted, and an instruction whether or not a slave station receiving said contention free end packet should relay said contention free end packet to another slave station, and a slave station which receives said contention free end packet transmits the other contention free end packet to said master station at a time indicated by said contention free end packet sent by the master station, so that the centralized control access phase switches to the distributed control access phase.

6. A method for radio communication in a plurality of radio stations, each radio station having at least one radio channel for packet radio communication, each radio station communicating with another radio station either directly or through at least one other radio station, each radio station communicating with an adjacent radio station in one of a centralized control access phase and a distributed control access phase for each radio channel, in case of the centralized control access phase, each radio station operating adaptively either as a master station which controls transmission right and transmits a signal according to control of the own radio station or as a slave station which transmits a signal under control of a master station, for each channel, and said centralized control access phase and said distributed control access phase being switched on a time divisional basis for each radio station and for each radio channel, wherein when a radio station operates in a radio channel as a master station, said radio station transmits a beacon packet including an address of said master station, an address of all the slave stations belonging to said master station and a time until each slave station should transmit a request packet to said master station responsive to said beacon packet, for indicating beginning of the centralized control access phase, and each slave station, upon receipt of said beacon packet, transmits said request packet to said master station at a time instructed by said beacon packet, and wherein a pair of radio stations operating under relation of a master station and a slave station finish the centralized control access phase and switch to the distributed control access phase, said master station transmits a contention free end packet indicating end of the centralized control access phase, said contention free end packet includes end time of said centralized control access phase, time until next beacon packet is transmitted, and an instruction as to whether or not a slave station receiving said contention free end packet should relay said contention free end packet to another slave station, and a slave station which receives said contention free end packet transmits the other contention free end packet to said master station at a time indicated by said contention free end packet sent by the master station, so that the centralized control access phase switches to the distributed control access phase.

7. The method for radio communication according to claim 6, wherein when a radio station $A_1$ transmits a signal to another radio station An through radio stations $A_2, A_3, , ,$ $A_k, A_{k+1}, , , A_{n-1}$ (k is an integer larger than 2 and equal to or smaller than n−1), a radio station $A_k$ communicates with a radio station $A_{k+1}$ through a radio channel between stations $A_k$ and $A_{k+1}$ having a relation of a master station and a slave station, or a radio channel between slave stations $A_k$ and $A_{k+1}$ controlled by a common master station.

8. The method for radio communication according to claim 6, wherein each radio station performs carrier sense for a predetermined time for each channel, when said radio station receives a beacon packet from a master station in a specific radio channel, said radio station operates as a slave station belonging to said master station in said radio channel, when said radio station does not receive a beacon packet from a master station but receives a request packet from a slave station in a specific radio channel, said radio station operates as a silent station which is prohibited from transmitting a signal when said master station operates in the centralized control access phase in said radio channel, and afterwards when said radio station receives a contention free end packet from a master station or a slave station, said radio station operates in the distributed control access phase until a time of next beacon packet indicated in said contention free end packet, and when said radio station receives no beacon packet from a master station and no request packet, said radio station operates as a master station in said channel in centralized control access phase.

9. The method for radio communication according to claim 8, wherein when a first radio station receives no beacon packet from a master station, and no request packet, said radio station selects second radio station which is connected to said radio station in another specific radio channel, said first radio station operates as a master station in said specific radio channel and said second radio station operates as a slave station belonging to said master station, or said second radio station operates as a master station and said first radio station operates as a slave station belonging to said master station.

* * * * *